May 26, 1953
F. M. TOMLINSON
2,639,736
MACHINE TOOL FEED
Filed Sept. 30, 1947
3 Sheets-Sheet 1
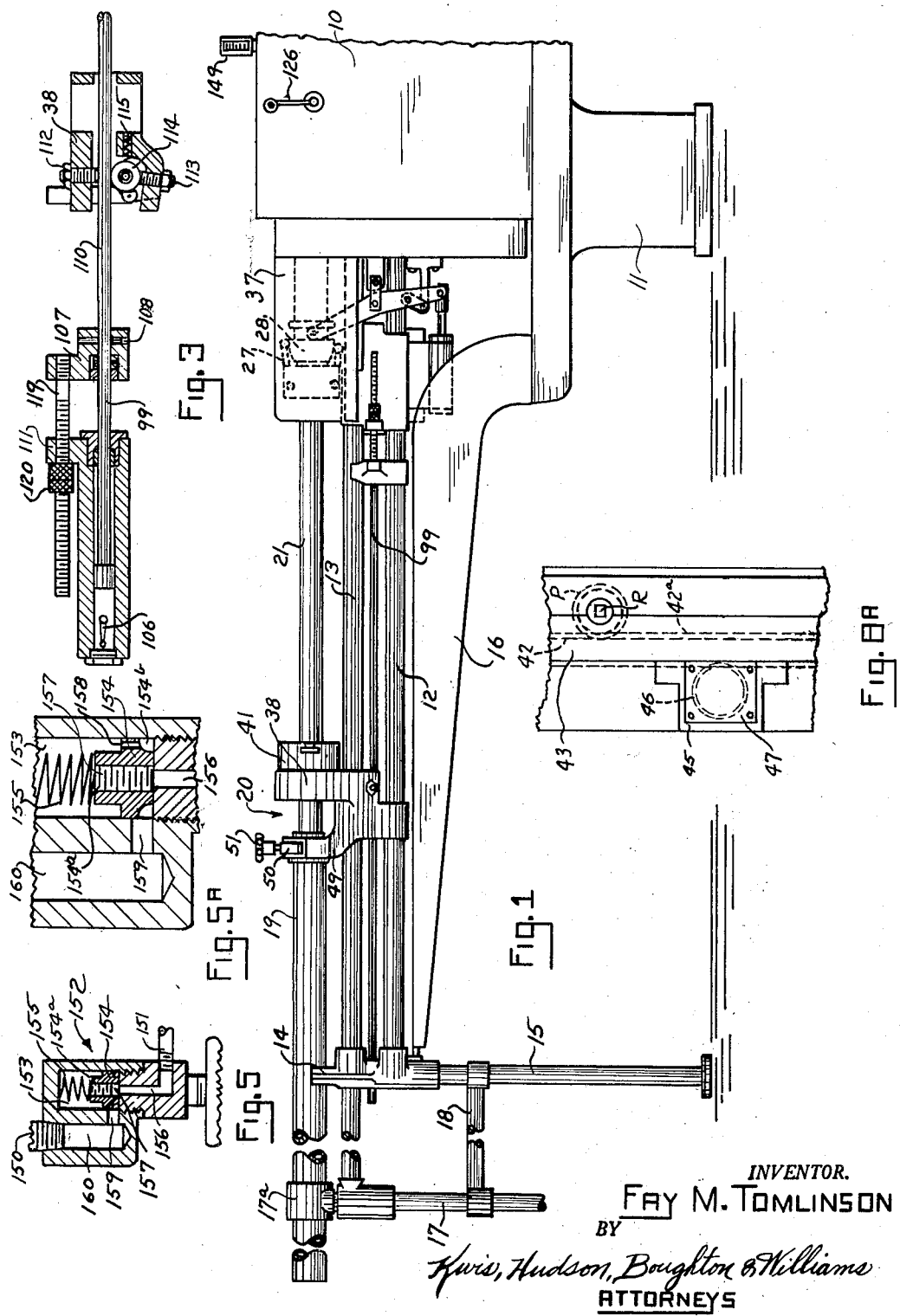
INVENTOR.
Fay M. Tomlinson
BY
Kwis, Hudson, Boughton & Williams
ATTORNEYS

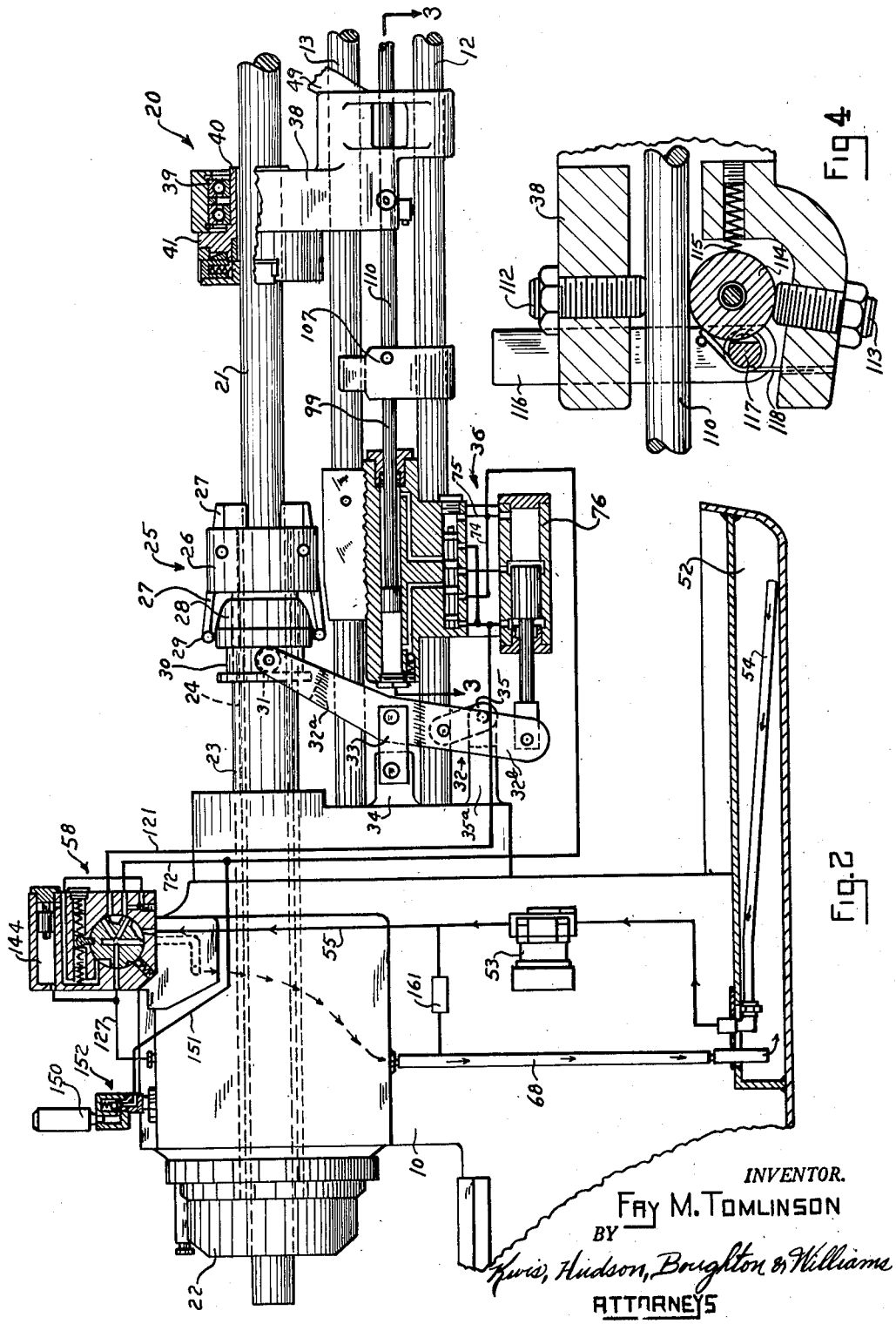

May 26, 1953    F. M. TOMLINSON    2,639,736
MACHINE TOOL FEED

Filed Sept. 30, 1947    3 Sheets-Sheet 3

INVENTOR.
Fay M. Tomlinson
BY
Kwis, Hudson, Boughton & Williams
ATTORNEYS

Patented May 26, 1953

2,639,736

UNITED STATES PATENT OFFICE 2,639,736

MACHINE TOOL FEED

Fay M. Tomlinson, Lakewood, Ohio, assignor to The Warner & Swasey Company, Cleveland, Ohio, a corporation of Ohio Application September 30, 1947, Serial No. 777,031

12 Claims. (Cl. 140—130.2)

This invention relates to a machine tool feed and, more particularly, to an improved fluid pressure actuated means for operating the chuck and bar feed mechanism of a bar type machine tool.

An object of the invention is to provide a novel and improved fluid pressure operated mechanism for actuating the work-holding chuck and the bar feeding mechanism of a bar type machine tool under the control of a single valve.

Another object of the invention is to provide a novel and improved fluid pressure operated mechanism for actuating the bar feeding mechanism of a bar type machine tool to feed predetermined lengths of the bar stock without requiring the use of a stock stop.

Another object of the invention is to provide a novel and improved fluid pressure operated mechanism for actuating the chuck and bar feeding mechanism of a bar type machine tool under the control of a single manually operated valve, the improved mechanism being so constructed and arranged that operation of the said valve to one position automatically sequentially actuates the chuck to work-gripping position and prepares the bar feeding mechanism to feed a predetermined length of bar stock, and operation of said valve to another position automatically sequentially actuates the chuck to work-releasing position and feeds the predetermined length of the bar stock.

A further object of the invention is to provide an apparatus of the type defined in the preceding object with means to brake the movement of the bar feeding mechanism adjacent its forward position in a bar feeding direction, thereby reducing the force with which the feeding movement of the bar stock terminates.

A still further object of the invention is to provide an apparatus of the type defined in the two preceding objects with a novel means for adjusting the length of feed of the bar stock without altering the operation of the fluid pressure actuated mechanism.

An additional object of the invention is to provide a novel and improved fluid pressure operated mechanism for actuatnig the chuck and bar feeding mechanisms of a bar type machine tool, which mechanism comprises a fluid pressure actuated piston for operating the chuck to and from gripping position, and for controlling the actuation of the bar feeding mechanism so that the chuck and bar feed are actuated in predetermined sequence.

It is also an object of the invention to provide a novel and improved apparatus of the type defined in the preceding object and wherein the fluid pressure operated mechanism for actuating the chuck and bar stock feeding mechanisms comprises a compact unit readily attachable to existing bar type machines.

A still further object of the invention is to provide a novel and improved fluid pressure operated mechanism for actuating the chuck and bar feeding mechanism of a bar type machine tool under the control of a single manually operated valve, the said valve being so constructed and arranged that it automatically returns to neutral position, means being provided to delay the return of the valve to neutral position after being operated for actuating the chuck to work gripping position thereby insuring that sufficient fluid pressure is applied to said chuck operating mechanism for proper operation thereof.

An additional object of the invention is the provision of a novel and improved means for indicating the fluid pressure employed to effect work-gripping by the jaws of the chuck of a machine tool, which pressure is proportional to the pressure exerted upon the work by the jaws of the chuck, the said means including a device to prevent indication of surges in the fluid pressure which are disproportional to the jaw pressure.

A still further object of the invention is to provide a novel means for interconnecting the actuating lever of a chuck with a member moving in a straight line, which means is so constructed and arranged that the latter member moves the actuating lever with substantially no radial thrust so that substantially the entire force of said member is effective to produce actuation of the chuck.

The invention further resides in certain novel features of construction and combinations and arrangements of parts, and further objects and advantages thereof will be apparent to those skilled in the art to which it pertains from the following description of the present preferred embodiment thereof, described with reference to the accompanying drawings, in which similar reference characters represent corresponding parts throughout the several views and in which:

Fig. 1 is a fragmentary front elevational view of a bar type machine tool provided with the new and improved fluid pressure operated mechanism for actuating the chuck and the bar feeding mechanism of the tool;

Fig. 2 is an enlarged fragmentary view, partly in section and partly in elevation, illustrating the headstock of the machine tool and the new and improved mechanism of the invention as applied to the machine, the view being taken from the rear of Fig. 1 with the cover for the chuck actuating mechanism removed;

Fig. 3 is a fragmentary sectional view of the actuating mechanism for moving the bar stock feeding chuck, the view being taken substantially on the section line 3—3 of Fig. 2;

Fig. 4 is an enlarged view of the right-hand portion of Fig. 3;

Fig. 5 is an enlarged sectional view of the surge prevention device for the chucking pressure indicator which is mounted upon the headstock and is illustrated to a smaller scale in Fig. 2;

Fig. 5a is a further enlarged fragmentary sectional view of a portion of the surge prevention device illustrated in Figs. 2 and 5;

Fig. 8a is an enlarged fragmentary plan view of the bar feeding chuck illustrated in Figs. 2 and 8.

Figure 6:
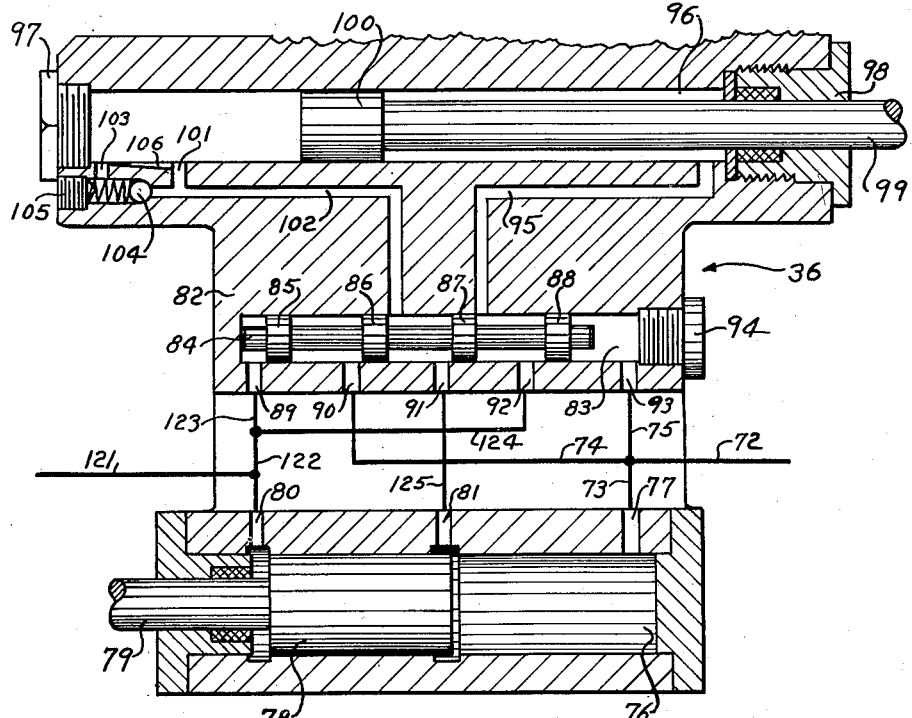
Fig. 6 is an enlarged sectional view of the novel fluid pressure actuated unit illustrated to a smaller scale in Fig. 2, for operating the chuck and bar stock feeding mechanisms.

In Fig. 1 of the drawings there is illustrated a portion of a conventional bar type machine tool comprising the usual headstock 10 mounted upon the base 11. Extending from the rear of the headstock 10 are parallel and vertically spaced rods 12 and 13 for supporting the bar stock and the bar stock feeding mechanism and for guiding the actuating mechanism of the latter. The rods 12 and 13 are supported in a conventional manner by a bracket member 14 mounted upon the upper end of a vertical standard 15, lateral support being provided by a substantially horizontal arm 16 extending between the base 11 and the bracket memebr 14. The rod 13 extends beyond the bracket 14 and is additionally supported by one or more vertical standards such as 17, one or more horizontally extending bracing rods or bars 18 being connected between the vertical standards to provide a rigid structure. The upper end of the standard 17 is provided with a pivoted sleeve 17a for slidably supporting a bar stock guiding tube 19 which is also supported upon the upper surface of the bracket 14. That end of the bar stock guiding tube 19 adjacent the headstock 10 has a bar feeding chuck, generally designated 20, mounted thereon. The lower portion of this feeding chuck is provided with suitable bores through which the rods 12 and 13 pass with a sliding fit to additionally support and guide the feeding chuck.

The bar feeding chuck 20 is adapted to feed a predetermined length of bar stock 21 through a conventional work-holding chuck 22, which may be of the collet type, carried by the hollow work spindle 23 rotatably mounted in the headstock 10 of the machine tool. The spindle 23 is provided with conventional means for effecting rotation thereof and the collet chuck 22 is of the type employing spring jaws operated in the well-known manner by an actuating sleeve 24 which extends through the spindle 23 as is well-known in the art. Movement of the actuating sleeve 24 is effected by means of a chuck actuating assembly 25 mounted upon the rear end of the spindle.

This chuck actuating assembly comprises the usual housing 26 in which a plurality of chuck actuating fingers 27 are pivotally mounted. As is well-known in the art, these fingers are in the form of levers, the shorter arms of which engage the chuck actuating sleeve 24 to move the latter and hence the spring jaws of the collet chuck to work gripping position when the longer arms of the fingers are moved outwardly.

This outward movement of the longer arms of the fingers 27 is effected by an actuating cone 28 which is slidably mounted on the spindle 23 and has an inclined surface for engaging rollers 29 on the outer ends of the longer ends of the fingers 27, the cone also having the usual land portion on which the rollers 29 rest when the chuck is in work-gripping position. The cone 28 is further provided with the usual groove 30 in which rollers 31, provided on the ends of the upper bifurcated portion 32a of an actuating lever or yoke 32, are positioned. This lever or yoke is floatably mounted by being pivoted intermediate its ends to the outer ends of a pair of spaced links 33 which straddle the lever or yoke and have their inner ends pivoted to an integral boss or bracket 34 provided upon the rear of the headstock 10. The lower portion or arm 32b of the lever 32 is also bifurcated and is pivotally connected to one end of a link 35, the other end of which is pivoted to a boss or bracket 35a provided upon the rear of the headstock. The lower portion 32b of the lever 32 is also pivotally connected to the outer end of a piston rod of a fluid pressure operated mechanism, generally designated 36, forming a part of this invention and which will be hereinafter described in detail.

From the construction just described, it will be readily apparent that when the lower end of the arm or portion 32b of the lever 32 is moved to the left, as seen in Fig. 2, the arm or portion 32a thereof will move the cone 28 to the right thereby rocking the fingers 27 which causes the collet chuck to grip the work. Movement of the lower end of the lever or yoke portion 32b in the opposite direction moves the cone 28 to the left, as viewed in Fig. 2, thus enabling the rollers 29 of the fingers 27 to move inwardly under the force provided by the resiliency of the spring jaws of the collet chuck, thereby releasing the work gripped therein. The pivotal mounting of the lever 32 by means of the links 33 and 35 enables the lower end of the lever to move in substantially a straight line when actuated by the fluid pressure operated mechanism 36. Hence, the entire thrust of the mechanism 36 is effective in moving the cone 28 and there is no appreciable radial thrust upon the lever or its pivotal mountings. The chuck actuating assembly 25 and the cone 28 for actuating the chuck are normally enclosed within a conventional cover 37 to prevent entrance of dirt into the moving part thereof.

The bar stock 21 extends through the collet actuating sleeve 24 and through the chuck 22 with a predetermined length of the bar stock extending beyond the chuck, the bar stock being gripped and rotated by the chuck to enable machining operations to be performed upon the said portion projecting forwardly of the chuck. After the machined portion of the bar stock has been severed from the main body of the bar stock the latter is fed longitudinally through the chuck actuating sleeve 24 and the chuck 22, while the chuck is in work releasing position, by means of the bar stock feeding chuck 20.

The bar stock feeding chuck 20 comprises a housing member, generally designated 38, which is slidably supported on, and guided by, the rods 12 and 13. The upper portion of the housing 38 is provided with a central bore in which are mounted anti-friction bearings 39 for journalling a reduced diameter sleeve portion 40 of a rotatable member 41 which has a central bore of sufficient diameter to freely receive bar stock of the greatest diameter to be employed in the machine and without contact between the bar stock and the wall of the bore. The member 41 supports the jaw assembly of the bar stock feeding chuck, which assembly comprises a scroll 42, see Fig. 8, rotatably retained on the forward face of the member 41 by an annular groove in the inner face of an integral cylindrical jaw supporting member 43. The latter is supported on the member 41 by a slightly reduced diameter portion thereof and by a ring member 44, the inner surface of which is substantially coextensive with the bore in the member 41. The jaw supporting member 43 is provided with radially extending T-shaped recesses or slots in each of which a jaw member 45 is slidably positioned, see Fig. 8a. Each jaw member is provided with a longitudinally extending opening in which is positioned a movable plug 46, the outer end of each of these openings being closed by a cover plate 47. The plug members 46 are each provided with a longitudinal bore in which is positioned a compression spring 48, the ends of the several springs projecting beyond the plug members and engaging the said jaw members 45 to urge the latter in bar stock engaging direction.

The outer face of the scroll 42 is provided with a spirally arranged thread cooperating with segmental threads upon the inner faces of the plugs or members 46 to radially move the latter, thereby adjusting the compression of the springs 48 and hence the pressure with which the jaws 45 grip the bar stock, when the scroll is rotated. To permit rotation of the scroll for this purpose, its inner face is provided with bevel gear teeth 42a which mesh with a bevel pinion P having an integral cylindrical portion journalled in an opening in the jaw supporting member 43 and provided with a polygonally shaped recess R for the reception of a suitable tool.

The construction is such that, by inserting a suitable tool in the recess R, the pinion P may be rotated thereby thus rotating the scroll 42 so that the spiral thread thereon, cooperating with the segmental threads on the members 46, cause the latter to move radially. This adjusts the compression of the springs 48 and hence the force with which the jaws 45 engage the bar stock 21. The plug members 46 are adjusted to an extent to cause the jaws to firmly grip the bar stock 21 with sufficient force so that the latter is moved through the chuck actuating sleeve 24 and the collet chuck 22 when the feeding chuck 20 is moved to the left, as viewed in Figs. 2 and 8, by means of the novel fluid pressure operated mechanism hereinafter described. When the bar feeding chuck is moved in the reverse direction and the forward portion of the bar stock is still held by the chuck 22, the jaws 45 yield radially sufficiently to allow the chuck 20 to slide or be stripped along the bar stock 21 to a new position.

The housing 38 for the bar feeding chuck 20 is also provided with a branch arm 49. The upper end of this branch arm 49 is provided with an opening to receive the guide sleeve or tube 19 and a clamp member 50, adapted to be actuated by a screw 51, is provided to effect clamping of the arm to the tube 19. Hence, when the bar stock 21 is fed forwardly through the collet chuck of the machine tool the bar supporting tube or sleeve 19 is carried therewith. However, when the bar stock feeding chuck 20 is moved rearwardly, while the collet chuck is in engagement with the work, the said bar stock feeding chuck and sleeve 19 move together rearwardly of the machine so that there is relative movement at that time between the bar stock 21 and its guiding sleeve 19 as is well understood in the art.

In accordance with this invention, fluid pressure actuated means are provided for operating the collet chuck and bar feeding mechanisms in predetermined sequence and under the control of a single main valve. In the illustrated embodiment oil is employed as the fluid which is supplied under pressure for actuating the novel mechanism. However, other liquids may be employed or a gas such as air may be utilized and hence the term "fluid" in the description and claims is intended to be construed generically.

In the form of the apparatus illustrated in the drawings, the bed of the machine tool is provided with a sump or reservoir 52 below the headstock 10, which reservoir is adapted to contain a suitable fluid, preferably oil or the like. Fluid is removed from the reservoir 52 and is supplied to the actuating mechanism by means of a conventional pump 53 which is driven by a mechanism, not shown, the pump being connected with an intake pipe 54, disposed within the reservoir, with its lower end extending adjacent the bottom of the latter. The output of the pump 53 flows through a pipe or conduit 55 which communicates with an arcuate recess 56 in a rotatable valve body 57 of a multiple passageway main valve, generally designated 58, the portion or body 57 of the valve being mounted for limited rotation in a casing 59 which has a bore or passageway 60 therein connected with the previously mentioned conduit or pipe 55. The construction is such that the bore or passageway 60 is in continuous communication with the recess 56 of the rotatable portion 57 of the valve for all positions of the latter.

The housing or casing 59 of the valve is also provided with two substantially parallel bores or passageways 61 and 62 which are adapted to be selectively placed in communication with passageways 63 and 64, respectively, in the rotatable portion 57 of the valve or with a recess portion 65 provided in the rotatable portion 57 of the valve intermediate the passageways 63 and 64. The rotatable portion 57 of the valve is preferably cylindrical and the recess 65 therein extends substantially parallel with the axis of the valve, this recess being in communication with a bore 66 and an exhaust passageway 67 provided in the housing 59 of the valve. The bore or passageway 67 is connected by a tube or conduit 68 with the reservoir 52 thereby providing an exhaust or return for the fluid. The rotatable valve body 57 is also provided with a radial bore or passageway 69 extending from the recess 56 and communicating with the passageways 63 and 64. The passageway 69 is likewise in communication with a radially extending bore or passageway 70 in the valve body 57, this latter passageway being adapted to be selectively placed in communication with a bore or passageway 71 through the wall of the valve housing 59.

The passageway 62 in the valve body 59 is connected with one end of a pipe or conduit 72 the other end of which communicates with interconnected pipes or conduits 73, 74 and 75 (see Fig. 6). The pipe or conduit 73 is in communication with the interior of a cylinder 76 through a port 77, in the side wall of the cylinder adjacent one end. This cylinder comprises a part of the actuating mechanism 36 for operating the collet chuck and the bar feeding mechanism and is provided with an elongated piston 78 the length of which is proportional to the longitudinal movement of the collet chuck actuating cone 28. The piston 78 is provided with a piston rod 79 which is pivotally connected to the lower end of the bifurcated portion or arm 32b of the chuck actuating lever 32, as previously described. The cylinder 76 is also provided with a port 80 adjacent the end opposite to that provided with the port 77 and intermediate its ends the cylinder is provided with a third port 81. The length of the piston 78 is such that when in either extreme position it will uncover the port 81 but will close this port relatively soon after being moved from that extreme position.

The cylinder 76 is preferably formed as a part of a unitary housing 82 for the actuating mechanism 36 although it will be understood that the several parts of the latter may be formed separately and interconnected to provide a unitary device. This housing 82 has an opening therethrough above the cylinder 76 for the reception of several conduits or pipes such as 72, 73, 74, etc. Above this opening the housing 82 has a horizontally extending cylindrical bore 83 in which is provided a cylindrical valve member 84 comprising spaced lands 85, 86, 87 and 88 which have a sliding, substantially liquid-tight, fit within the bore 83. The portions of the valve between the lands are of reduced diameter, as is clearly shown in Fig. 6, and the ends of the valve have projecting portions to limit its movement within the bore 83. The housing 82 is also provided with a plurality of ports 89, 90, 91, 92 and 93 communicating with the bore 83 the open end of which is closed by a plug 94 to provide a fluid-tight closure.

Above the bore 83 the housing 82 of the fluid pressure actuated mechanism 36 is provided with a bore or passageway 95 one end of which communicates with the bore 83 adjacent the central portion thereof and on the opposite side of bore from that in which the ports 89 to 93 are located. The other end of the passageway 95 communicates with the end of a cylindrical bore 96 in the upper portion of the housing 82, this bore 96 constituting a cylinder for the bar feeding actuating piston. The ends of the bore 96 are closed by a plug 97 and a stuffing gland and nut 98, respectively. A piston rod 99 passes through the stuffing gland and nut 98 and its inner end is provided with a piston 100. The bore 96 is provided with a radially extending port 101 adjacent to, but spaced from, the plug 97 and this port communicates with a passageway 102 which extends into communication with the bore or cylinder 83 adjacent the central portion of the latter on the opposite side of the bore 83 from that in which the ports 89 to 93 are located. Closely adjacent the plug 97 the cylinder or bore 96 is provided with another radially extending port 103 which also communicates at certain times with the passageway 102, the outer end of the passageway 102 being counterbored and provided with a spring pressed ball valve 104 held in place by a plug 105 which also serves to seal the end of the passageway 102. The construction is such that the port 103 is in communication with the passageway 102 only when the ball valve 104 is unseated against the force of its spring. Intermediate the ports 101 and 103 the wall of the cylinder 96 is provided with a tapered recess 106, see also Fig. 3, for a purpose hereinafter described.

The piston rod 99 extends through a bore in a bracket member 107, the rod being connected to the member by a dowel pin 108. The portion of the piston rod beyond this bracket member is designated 110 and extends to and through a recessed opening in the bottom of the housing 38 for the bar stock feeding chuck 20. While the portion 110 of the piston rod has been illustrated as formed integral with the portion 99 it will be apparent that these may be made separate and coupled together by conventional means. This would facilitate assembly of the parts and compensate for small mis-alignments between the various openings through which the rod passes.

The lower portion of the housing 38 of the bar stock feeding chuck is provided with a transversely extending screw 112 the inner end of which is adapted to engage the side of the portion 110 of the piston rod 99, see Fig. 4. The other side wall of the recess in the lower end of the housing 38 is provided with a screw 113 the axis of which extends at an angle with respect to that of the screw 112. Between the inner end of the screw 113 and the rod there is provided a roller 114 which has a central opening in which a pin is disposed. The pin is carried by the housing 38 and is considerably smaller in diameter than the opening in the roller. The housing 38 is also provided with a compression spring 115 which extends at substantially right angles to the screw 112 and bears against the periphery of the roller 114. The angle of inclination of the screw 113 relative to the screw 112 is such that the roller 114 acts as a ball or roller clutch for gripping the portion 110 of the piston rod when the bar chuck 20 is moved to the left as viewed in Figs. 2 and 3, that is, in a direction for feeding bar stock to the machine. When the rod is moved in the reverse direction the roller 114 can shift slightly against the spring 115 so that the portion 110 of the rod can now slide freely through the housing 38 of the mechanism 20.

Release of this roller clutch at any time is readily effected by means of a manually operated lever 116 pivotally attached adjacent the bottom of the housing 38 by connection with a vertically extending camming rod 117 which is journalled in the housing 38. This rod 117 extends adjacent the roller 114 and has a flattened or recessed portion on one side thereof. Hence, by turning the handle or lever 116 the rod 117 is rotated from the position shown in Fig. 4, moving the flattened or recessed portion away from the roller 114, so that the rod 117 shifts the roller 114 against the action of the spring 115 thereby disengaging the roller 114 from contact with the portion 110 of the piston rod so that the bar chuck 20 may be freely moved with respect thereto. In order to retain the rod 117 and lever 116 in their positions illustrated in Fig. 4 a spring 118 is provided, which spring extends about the rod 117 and has one end connected with the housing 38 and the other end connected with the manually operated lever 116 by a pin or the like.

Movement of the piston rod 99 rearwardly of the headstock 10, that is, to the right as shown in Figs. 2 and 3, is limited by means of a threaded shaft or screw 119 which has one end screwed within a projecting lug on the bracket member 107, the other end of the threaded shaft extending with a sliding fit through and beyond a projecting lug 111 on the body of the mechanism 36 which is, in turn, fixedly secured to the rods 12 and 13 or directly to the headstock of the machine. The threaded shaft or screw 119 is provided with adjusting nuts 120 to regulate the amount of relative movement between the member 107 and the lug 111 on the housing for the mechanism 36. The construction is such that when the piston rod 99 is moved rearwardly with respect to the headstock, to the right as shown in Figs. 2 and 3, the bar chuck 20 remains stationary, the portion 110 of the rod slipping with respect thereto by the action of the roller 114. The extent of this rearward motion is determined by the positions of the nuts 120 upon the threaded shaft 119, the movement of the portion 110 of the piston rod, relative to the bar stock feeding chuck, in this direction being terminated by the nuts 120 abutting the lug 111. It will be remembered that the bar stock chuck 20 grips the bar stock 21 and that when the piston rod moves to the left, as viewed in Figs. 2 and 3, the portion 110 thereof is gripped by the roller 114 and screw 112 so that the bar chuck is moved therewith. Therefore, movement of the piston rod 99 to the left feeds the bar stock 21 through the collet chuck 22 of the machine tool, so that the adjustment of the nuts 120 upon the shaft or screw 119 determines the length of bar stock which is fed during each movement of the bar stock feeding chuck 20. The feeding of the bar stock occurs sequentially with respect to the actuation of the collet chuck by virtue of the operation of the piston 78 and the valve member 84 in the actuating mechanism 36 as hereinafter described.

The fluid connections to the cylinders 76 and 83 of the actuating mechanism 36 are completed by pipes or conduits 121, 122, 123, 124 and 125. Thus, the pipe or conduit 121 has one end connected with the bore 61 in the casing for the valve 58 while the other end of this pipe or conduit is connected to pipes 122 and 123 which are, respectively, connected to the port 80 and to the port 89, see Fig. 6. The conduit or pipe 123 is also connected by the pipe or conduit 124 to the port 92, and the ports 81 and 91 are connected by a pipe or conduit 125. The mechanism 36 is, therefore, connected with the valve 58 in a manner such that the operation of the device is effected by selectively positioning the valve body 57 of the valve to establish communication between various of the passageways therein and the pipes connected with the cylinders of the mechanism. Positioning of the valve body 57 is effected by means of a manually operated handle or lever 126 connected with the valve body and rockably mounted upon the headstock 10 of the machine tool where it is conveniently accessible to the operator who effects feeding of the bar stock and chucking thereof by selectively actuating the said handle 126 in opposite directions, the rotation of the valve body 57 in either direction being limited by conventional stop means, not shown.

In order to facilitate understanding of the mode of operation of the apparatus described above, let it be assumed that a machining operation has just been completed so that it is first necessary to release the collet chuck and to feed a new length of bar stock through the chuck, and then to again grip the bar stock by means of the chuck and prepare the feeding mechanism for its next operation. The operator begins this cycle of operations by grasping the handle 126 and rotating it in the direction which brings the passageway 63 of the valve body 57 into alignment with the port 61. Since the pump 53 is in continuous operation during the use of the machine, oil or other suitable fluid is withdrawn from the reservoir 52 through the pipe 54 by action of the pump, the liquid being forced upwardly through the pipe 55 and into the recess 56 of the valve body. From the recess 56 the fluid under pressure flows through the passageways 69 and 63, to and through the port 61, and thence through the pipes 121 and 122 into the cylinder 76 adjacent the left hand end thereof as viewed in Figs. 2 and 6. The fluid under pressure thus admitted to the cylinder 76 by operation of the valve 58 forces the piston 78 to the right as viewed in Figs. 2 and 6. Hence, the piston rod 79 rocks the lever 32 moving the finger actuating cone 28 of the collet chuck mechanism to the left as viewed in Figs. 2 and 6 thereby releasing the fingers 27 so that the jaws of the collet chuck move, by their natural resiliency, to work releasing position. Any fluid in advance of the piston 78 is exhausted through the port 77 and pipes 73, 72 which are now in communication with the drain or exhaust recess 65 in the valve body 57, it being remembered that the recess 65 is in communication with the reservoir 52 through the passageways 66, 67 and pipe 68.

At the same time that the fluid under pressure was applied through pipes or conduits 121 and 122 to the cylinder 76, fluid under pressure was also applied through the pipes 123 and 124 to the cylinder or bore 83 through the ports 89 and 92, respectively. This pressure acts upon the land or piston portion 85, of the valve member 84 to exert force thereon so that the valve member 84 moves to its extreme right-hand position as shown in Figs. 2 and 6, any fluid in advance of the land or piston portion 88 being exhausted through port 93 and pipes 75, 72 communicating with the exhaust recess 65 in the valve body. The action of the fluid pressure upon the land or piston portion 87 does not interfere with this operation since it is balanced by the action upon the land or piston portion 88.

As the piston 78 nears the end of its stroke, which, as mentioned above, effects release of the collet chuck, it uncovers the port 81 in the cylinder 76. Hence, fluid under pressure now flows through the cylinder 76 from the port 80 to and through the port 81 and thence through the pipe 125 to enter the cylinder 83 through the port 91. The valve member 84 having been moved to the right, as mentioned before, a passage is provided between the lands 86 and 87 to the passageway 95, the passageway 102 having been sealed off from the port 91 by the land 86. The pressured fluid therefore passes through the passageway 95 and enters the cylinder 96 adjacent the right-hand end thereof causing the piston 100 to move to the left as viewed in Figs. 2 and 6.

The movement of the piston 100 to the left, as viewed in Figs. 2 and 6, causes the piston rod 99 to be moved to the left. As the portion 110 of this rod is thus moved it carries with it the bar stock feeding chuck 20 since the ball or roller type clutch, provided by the roller 114 and the associated mechanism in the lower portion of the housing for the bar stock feeding chuck, firmly grips the rod. Movement of the bar stock feeding chuck 20 in this direction causes the bar stock 21 to be correspondingly moved or fed since the jaws 45 of the bar stock feeding chuck grip the bar stock. In order to slow up the feeding movement of the bar stock when it nears the end of its movement a novel braking action is provided for the bar feeding mechanism. This braking action is due to the provision of the spaced ports 101, 103 and the tapered groove or recess 106 adjacent the left-hand end of the cylinder 96. As the piston 100 moves to the left, as previously mentioned, the fluid in advance thereof is exhausted through the port 101, passageway 102 and a passage provided between the lands 85 and 86 of the valve member 84, it being remembered that this valve member has been shifted to the right, as viewed in Fig. 6. The fluid thus exhausted passes out of the cylinder 83 through the port 90, through the pipes 74 and 72, and through the port 62 of the valve 58 which is now in communication with the exhaust recess 65. As the piston 100 approaches the end of the cylinder 96 the port 101 is closed by the piston except for the opening thereto provided by the tapered recess 106. As the piston continues to move further towards the plug 97 the fluid in advance of the piston must now flow through the restricted orifice provided by the tapered groove or recess 106 communicating with passageway 102, this tapered groove or recess being disposed so that a progressively smaller area is available for exhausting the fluid as the piston approaches the end of the cylinder. Hence, a dashpot or braking action is effected so that the bar stock, fed by movement of the piston 100, comes to rest without effecting any appreciable blow or impact due to the abutment of the bracket member 107 with the nut 98 of the housing 36. As is well-known in the art, a fixed stock stop (not shown) may be provided upon the machine tool against which the forward portion of the bar stock abuts to limit the length thereof extending beyond the forward portion of the collet chuck. When such a stop is employed the above-mentioned braking or dashpot action is additionally advantageous since it prevents the bar stock from striking the stop with sufficient force to cause springing of the parts or rebound of the bar stock.

The operator now grasps the handle 126 and moves the latter in the opposite direction to the previous actuation thereof, thereby moving the valve body 57 to place the passageway 64 in alignment with the port or passageway 62 and the port or passageway 61 in communication with the exhaust recess 65. Fluid under pressure is, therefore, supplied from the conduit 55 and recess 56 through the passages 69 and 64 of the valve, and this fluid passes through the port or passageway 62 and conduits 72, 73 to enter the cylinder 76 through the port 77 thus forcing the piston 78 to the left to its position as shown in Fig. 6. This causes the piston rod 79 to rock the cone actuating lever 32 in a direction to move the finger actuating cone 28 to the right as shown in Fig. 2 thereby rocking the fingers 27 in the direction which effects closing or work-gripping of the jaws of the collet chuck so that the newly fed bar stock is firmly gripped.

Fluid under pressure is also simultaneously admitted through the conduit 75 and port 93 to the valve cylinder or bore 83, and through the pipe 74 to the valve cylinder or bore 83 through the port 90. The pressure exerted by the fluid entering the port 93 is effective upon the land or piston portion 88 to move the valve body 84 to the position as shown in Fig. 6 while the pressure exerted upon the lands or piston portions 85 and 86 by the fluid admitted through the port 90 balance each other. This movement of the valve body 84 now provides a communicating path through the cylinder 83 between the lands 86 and 87 so that fluid under pressure can now flow from the cylinder 76 through the port 81, which was uncovered by movement of the piston 78 to its position as shown in Fig. 6. The fluid therefore passes through the port 81 and pipe 125, flows between the lands 86, 87, and thence through the passageway 102 thereby unseating the ball valve 104, so that the fluid under pressure enters the cylinder 96 through the port 103. This fluid acts upon the piston 100 to move the latter to the right and to its position substantially as shown in Fig. 6 during which movement the port 101 is also uncovered providing an additional path for the pressured fluid.

During this movement of the piston 100 the fluid in the right-hand portion of the cylinder 96 is exhausted through the passageway 95, through the passage in the cylinder 83 provided between the lands 87 and 88 and through the port 92 to the pipe 124. From thence the exhausted fluid passes through pipes 122 and 121 into the port or passageway 61 of the valve 58, through the recess 65 and passageway 66 to the return conduit 67, and thence downwardly through conduit 68 to the reservoir 52. The fluid adjacent the left-hand side of the piston 78 was also exhausted through port 80, pipes 122, 121 and through the valve passageways and pipe 68 to the reservoir.

The distance which the piston 100 moves under the action of the fluid pressure applied to the ports 101 and 103 is determined by the adjusted positions of the nuts 120 upon the threaded shaft or screw 119 since the said nuts strike the lug 111 upon the housing 82 of the fluid actuated mechanism 36. This limits the movement of the piston 100 due to the fact that its rod 99 is connected with the shaft or screw 119 by the bracket 107. During this movement of the piston 100 and piston rod 99 the bar stock feeding chuck remains stationary but the roller 114 yields against the spring 115 so that the rod 110 freely slides through the housing 38 of the bar stock feeding chuck. The feeding mechanism is thus prepared for again feeding a predetermined length of bar stock, the length of the fed portion being determined by the positions of the nuts 120 upon the threaded shaft or screw 119.

The improved mechanism of this invention is also provided with means for automatically returning the valve body 57 of the valve 58, and hence the handle 126, to neutral position when the said handle is released by the operator. This position for the valve 58 is that illustrated in Figs. 2 and 7 from which it will be seen that the fluid under pressure supplied through the conduit 55 now enters the recess 56 and passageway 69 flowing through the passageways 70 and 71 to a pipe or conduit 127. This pipe leads to a conventional lubricating reservoir (not shown) in the headstock of the machine, since the fluid employed in the illustrated embodiment is oil, the excess fluid from the latter being returned to the reservoir 52. Also, when valve 58 is in this neutral position, the conduits 121 and 72 are both in communication with the recess 65 in the valve body 57, which recess communicates with the return or exhaust pipe 68 through the passageways 66 and 67 of the valve. Hence, any fluid pressures within the cylinders 76, 83 and 96 are released so that no part of the actuating mechanism 36 remains under pressure.

Figures 7, 8:
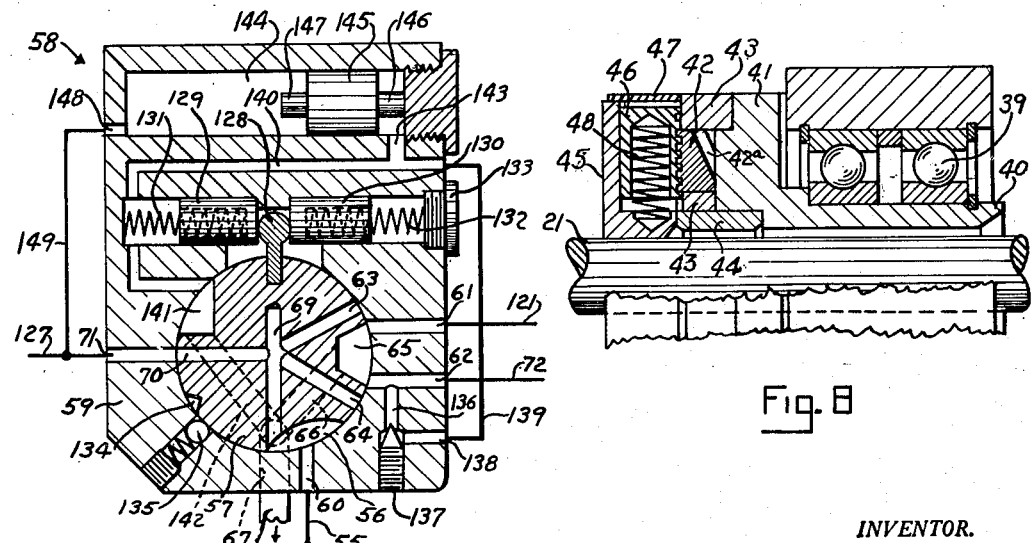
Fig. 7 is an enlarged sectional view of the novel manually operated valve for the improved mechanism, illustrated to a smaller scale in Fig. 2.
Fig. 8 is an enlarged view, partly in section and partly in elevation, of the bar feeding chuck as illustrated to a smaller scale in Fig. 2.

In order to automatically return the valve body 57 and handle 126 to their neutral positions, as shown in Figs. 2 and 7, the said body is provided with a radially extending projection 128 which has a substantially cylindrically shaped outer portion received between plungers 129 and 130. These plungers are slidably positioned in bores in the body 59 of the valve, which bores extend at right angles to the plane of the member 128 when the latter is in neutral position. The plungers 129 and 130 are resiliently urged against the member 128 by compression springs 131 and 132, respectively, the outer ends of which respectively bear against the bottom of the bore for the plungers and a plug 133 which closes the bore.

The springs 131 and 132 are of equal strength and, hence, act to return the valve to its neutral position as soon as the handle 126 thereof is released. However, in order to insure that sufficient fluid pressure has been applied to the fluid operated mechanism 36 to effect complete work gripping action of the collet chuck, means are provided to delay the return of the valve body 57 to its neutral position for a predetermined lenth of time after it is actuated to chuck closing position. This is effected in the present construction by providing a notch or recess 134 in a portion of the periphery of the valve body 57 for cooperation with a spring pressed, ball type detent 135 mounted in the housing 59 for the valve and acting radially inwardly. Hence, when the handle 126 of the valve is moved in a direction to effect work gripping by the collet chuck, the recess 134 of the valve body 57 moves into alignment with the ball detent 135 and the latter exerts sufficient force to hold the valve body in its operated position against the action of the spring 131 which normally tends to return the valve to its neutral position.

The passageway 64 of the valve is now in communication with the port or passageway 62 so that fluid under pressure also flows through a branch port or passageway 136 communicating with the port or passageway 62. This passageway 136 is provided with an adjustable needle valve 137 to regulate the rate of passage of the fluid therethrough and through the connecting passageway 138. The passageway or port 138 is connected by a pipe or conduit 139 with a passageway 140 in the valve body 59 and this latter passageway also communicates with the bore in which the plunger 129 is positioned so that the fluid under pressure is applied behind the latter. The passageway 140, in the neutral position of the valve, communicates with a recess 141 in the valve body 57, and this recess is connected by a passageway 142 with the exhaust port or passageway 67. However, when the valve is actuated to chuck closing position, the passageway 140 is no longer in communication with the recess 141. The passageway 140 is also provided with a port 143 which communicates with a cylinder 144 provided in the valve body 59. Within the cylinder 144 is slidably positioned a piston 145 having reduced axially extending projections 146 and 147 for engaging the end walls of the cylinder and thereby preventing the piston from sealing the port 143, and the port 148, the latter being provided in the opposite end of the cylinder from that in which port 143 is positioned. The port 148 is connected by a conduit or pipe 149 with the pipe 127 leading to the previously mentioned reservoir in the headstock of the machine which drains back to the reservoir 52.

The construction just described is such that when the valve body 57 has been operated to effect chuck closing or work-gripping the recess 134 aligns with the ball detent 135 thus holding the valve body against return movement under the influence of the spring 131. A portion of the fluid under pressure, which is supplied through the passageway or port 62 by this position of the valve, now passes through the passageways 136 and 138 and through the conduit 139 to the passage 140 in the valve casing, the rate of flow of the fluid being regulated by the adjustment of the needle valve 137. Since the passageway 140 is in communication with the cylinder 144 the piston 145 is moved to the left, as viewed in Fig. 7, any fluid in advance of the piston being exhausted through the port 148 and the pipe 127 to the lubrication reservoir in the headstock 10.

Due to the restriction of the passageway 136 by the needle valve 137 a certain predetermined length of time is required before sufficient fluid has entered the cylinder 144 to move the piston 145 to its extreme left-hand position as viewed in Fig. 7. During this interval the pressure within the cylinder 76 of the mechanism 36 will have built up to a sufficient value to fully operate the collet chuck to its work-gripping position, the length of time required for the piston 145 to move through the cylinder 144 being adjustable by the adjustment of a needle valve 137. When the piston 145 has reached its extreme left-hand position, the pressure of the fluid therein and in the passageway 140 increases and this increased pressure acts upon the plunger 129 to move the latter to the right, as viewed in Fig. 7 thereby assisting the spring 131 to return the valve body 57 to its neutral position since the force thus exerted is sufficient to overcome the action of the spring detent 134.

When the valve body 57 has thus returned to its neutral position the passageway 71 is in communication with the passageway 70 so that fluid under pressure is now applied through the pipes or conduits 127 and 149 to the port 148 of the cylinder 144. This moves the piston 145 back to its position as shown in Fig. 7 preparing the mechanism for a new operation. As mentioned before, the pressuring fluid also flows through the pipe or conduit 127 into the lubrication reservoir of the headstock of the machine when the valve is in its neutral position. While the piston 145 is moving back to its initial position the fluid in advance thereof is exhausted through the passageway 140, recess 141 and passageway 142, since the return of the valve to its neutral position places the recess 141 in alignment with the passageway 140.

In order that the pressure employed in effecting work-gripping by the collet chuck may be determined, so that the proper pressure may be employed for the type of stock utilized, a pressure indicating means 150 is provided. This pressure indicator may be a conventional pressure gauge and is connected with the conduit 72 by a pipe or conduit 151 so that the fluid pressure applied to the mechanism 36, in a direction to operate the collet chuck to work-gripping position, will be indicated. During the actuation of the collet chuck to its work-gripping position, the fluid pressure required to move the tapered portion of the finger actuating cone 28 beneath the finger rollers 29 is substantially proportional to the gripping pressure exerted by the jaws of the collet chuck. However, when the rollers 29 pass up on the land of the finger actuating cone 28 the fluid pressure in the apparatus momentarily drops and then is rapidly raised to a high value when the piston 78 reaches the end of its stroke and the bar feeding mechanism is actuated. These latter-mentioned pressures are disproportional to that of the work gripping pressure exerted by the jaws of the chuck. In order to prevent these latter-mentioned pressures, which appear in the form of a surge or surges of fluid pressure in the pipes 72 and 151, from registering upon the gauge 150 a novel device 152 is interposed between the pipe or conduit 151 and the pressure gauge 150.

As shown most clearly in Figs. 5 and 5a of the drawings, this surge prevention device 152 comprises a bore or cylinder 153 in which is slidably positioned a piston or plunger 154, the upper end of which is provided with an extension of reduced diameter designated 154a. This piston 154 is normally held against the bottom of the bore 153 by a compression spring 155 and the bottom of the bore 153 communicates with a central passageway 156 of reduced diameter with respect to the bore 153, the passageway 156 in turn communicating with the pipe 151. The piston or plunger 154 is provided with a central bore, having a diameter larger than that of the passageway 156, and this bore in the piston is provided with a tortuous path or fluid flow resistance 157 of suitable construction, for example, like that disclosed in my co-pending application Serial No. 636,039, filed on December 19, 1945, and now issued as Patent No. 2,505,221. The plunger or piston is also provided with a recess or groove 154b extending around its periphery and intersecting the lower face of the piston, see Fig. 5a. This groove or recess communicates with the space above the piston through a passageway 158 in the piston while a passageway 159, adjacent the bottom of the bore 153, provides communication of this bore and the groove 154b with an opening or bore 160 having a threaded portion to which the pressure gauge 150 is connected.

The device 152 operates as follows. Fluid pressure applied through the pipe 151 must act upon the relatively small area of the piston 154 provided by the bottom of the fluid flow resistor or flow retarder 157. Hence, the pressure created in the pipe 72 is not immediately applied to the pressure indicator 150 since the spring 155 holds the piston 154 upon its seat. However, by the time the pressure in the pipes 72 and 151 has increased to an amount corresponding approximately to the lower limit of the operating range of collet chuck pressures, the piston 154 will be unseated against the action of the spring 155 so that the fluid pressure is applied to the gauge 150 through the port 159 and bore 160. Fluid under pressure also passes through the passageway 158 in the piston 154 thus entering the upper end of the bore 153 above the piston. This enables the fluid pressure to equalize on both sides of the piston so that the force of the spring 155, is sufficient to cause the piston 154 to again seat against the bottom of the bore. The device is so designed that this reseating of the piston occurs when the fluid pressure in the pipes 72 and 151 momentarily drops due to the rollers 29 passing up onto the land of the finger actuating cone 28. The force exerted by fluid trapped above the piston 154, together with the force of the spring 155, is sufficiently great to prevent the unseating of the piston 154 when the momentary surge of pressure occurs as the piston 78 reaches the end of its stroke and the bar feeding mechanism is actuated since this latter pressure acts against the relatively small area of the lower face of the piston 154 corresponding to the area of the passageway 156 while the fluid trapped above the piston acts upon the entire area of the upper surface of the piston. Hence, this surge of pressure is not indicated on the indicator 150.

The fluid which is in the upper portion of the bore 153, as a result of the operation just described, gradually finds its way back through the flow retarder or fluid resistor 157 when the conduit 72 is connected with the exhaust port or passage 67 by the return of the manually operated valve to its neutral position. Hence, the fluid pressure above the piston 154 is dissipated during the machining operation and before the next operation of the collet chuck so that the pressure for unseating the piston upon the next operation need only be great enough to overcome the force of the spring 155. The device then acts as before to prevent the undesirable surge or pressure pulse, which is disproportional to the gripping pressure of the chuck, from being indicated on the gauge 150. The flow retarder 157 offers sufficient obstruction to the passage of the liquid so that substantially none of the liquid is forced upwardly therethrough during the relatively short interval during which the collet chuck is being actuated.

A pressure relief valve 161 of conventional construction is preferably connected between the conduits 55 and 68 as a safety feature to prevent excessive pressures from being developed in the system. As will be readily understood, any excessive pressure which is developed within the system by operation of the pump 53 is relieved through this relief valve 161 to the return conduit 68.

It is believed that the operation of the device will now be apparent from the foregoing description. However, it may be briefly summarized as follows: Let it be assumed that a machining operation has just been completed upon a portion of the length of the bar stock 21 positioned in the apparatus. The various parts of the apparatus will then be in the positions illustrated in the drawings with the collet chuck 22 in work-gripping position, the nuts 120 on the screw 119 in engagement with the lug 111 on the fluid actuated mechanism 36, and the manually operated control valve 58 in its neutral position. Hence, the cylinders or bores 76, 83 and 96 in the fluid actuated mechanism 36, the bores or cylinders 153 and 160 in the surge prevention device for the indicator 150, and the passageway 140 in the valve casing 59 are in communication with the reservoir 52 through the recesses and passageways 65, 66, 67, 141 and 142 of the valve 58 and the return pipe 68. The pump 53 will be in operation and hence fluid under pressure will be supplied through the recess 56 and the passageways 69 and 70 of the valve 58 and through the pipe 127 to the reservoir in the headstock 10, and through the pipe 149 to the cylinder 144 in the valve casing 59.

The machining operation upon the bar stock being completed and the machined portion severed therefrom, the operator moves the actuating handle 126 of the valve 58 in the direction which rotates the valve body 57 clockwise as viewed in Figs. 2 and 7 thus bringing the passageway 63 into alignment with the port or passageway 61 and moving the passageways 64 and 70 out of alignment with the ports or passageways 62 and 71, respectively. This movement of the valve does not, however, interrupt the communication between the recess 65 and the passageway 62, or the communication between the recess 141 and the passageway 140, due to the relatively large sizes of these recesses. This actuation of the valve member therefore results in the supplying of fluid under pressure to the port 80 of cylinder 76, and to the ports 89 and 92 of the cylinder or bore 83, while the port 77 of cylinder 76 and ports 90 and 93 of cylinder 83 remain in communication with the fluid exhaust or return path to the reservoir 52. Hence, the piston 78 and the valve member 84 are moved to their extreme right-hand positions as viewed in Figs. 2 and 6 of the drawings. This movement of the piston 78 rocks the lever or yoke 32 in a counterclockwise direction, as viewed in Fig. 2, thereby retracting the finger actuating cone 28 so that the natural resiliency of the jaws of the collet chuck causes the said jaws to move to work releasing positions since the finger rollers 29 are now free to move inwardly.

When the piston 78 has completed its movement, thereby completely releasing the jaws of the collet chuck, the port 81 in the cylinder 76 is uncovered so that fluid under pressure now flows from the port 80 through the space in the cylinder behind the piston 78, through the port 81, pipe 125 and port 91 to the space between the lands 86 and 87 of the valve 84. It will be remembered that the valve 84 has now moved to its extreme right-hand position and hence a pathway for the fluid is provided between the lands 86 and 87 of the valve 84 so that the fluid flows through the passageway 95 into the cylinder 96 at the right-hand side thereof. This fluid entering the cylinder 96 then acts upon the piston 100 moving the latter to the left and correspondingly moving the bar stock feeding chuck 20 because the clutch in the lower portion of the latter mechanism operates to clutch the bar feeding chuck 20 with the portion 110 of the piston rod 99 connected with the piston 100. Since the jaws 45 of the bar feeding chuck 20 are gripping the bar stock 21, the latter is thus fed through the hollow spindle of the machine tool and through the collet chuck 22 thereof.

The bar stock 21 is thus fed until its forward end abuts a fixed stop, not shown, upon the machine tool. Just prior to this abutment, however, the piston 100 within the cylinder 96 will have closed the port 101 except for the restricted orifice provided by the tapered opening or recess 106, so that the fluid between the piston and the plug 97 must now exhaust to the passageway 102 through the said tapered opening 106. This retards the exhausting of the fluid in advance of the piston and acts as a dashpot or brake so that the bar stock engages the aforementioned fixed stop without exerting sufficient force thereon to cause recoil or undue stressing of the parts. The piston 100 moves substantially into engagement with the plug 97 during each feeding stroke, the length of the stroke having been determined by the adjustment of the screws 129 which regulate the distance which the piston 100 moves away from the plug 97 during the non-feeding or return stroke of the piston.

The release of the collet chuck and the feeding of the bar stock are effected in the above described sequence in a relatively short interval of time so that the operator need not hold the handle 126 of the valve at its operated position.

The valve when released is automatically returned to its neutral position by the action of the spring 132 acting upon the radial projection 128 on the valve body 57 so that the several cylinders or bores of the actuating mechanism 36 are again vented or exhausted to the reservoir 52 as previously described.

The operator now moves the handle 126 in the reverse direction to that in which he initially moved it so that the valve body 57 is now rotated in a counterclockwise direction, as viewed in Figs. 2 and 7. Hence, the passageway 64 is now in communication with the port or passageway 62, the recess 65 is in communication with the port or passageway 61, and the passageway 70 and recess 140 are, respectively, moved from communication with the passageways 71 and 140. The operator may now release the handle 126 since the recess 134 in the valve body is engaged by the ball detent 135 thus holding the valve in its operated position. Fluid under pressure is now supplied to the port 77 in cylinder 76, and to ports 90 and 93 of the cylinder or bore 83, the port 80 of cylinder 76 and ports 89 and 92 of cylinder 83 now being vented or exhausted through the pipe 121 as previously described.

The fluid entering the cylinder 76 through the port 77 moves the piston 78 to its extreme left position, that is, to the position illustrated in Figs. 2 and 6, and the fluid entering the ports 90 and 93 of the cylinder or bore 83 move the valve 84 to its illustrated position. This movement of the piston 78 rocks the lever 32 in a clockwise direction, as viewed in Fig. 2, so that the finger actuating cone 28 rocks the fingers 27 of the collet chuck mechanism in the direction which effects closing of the jaws of the collet chuck to workgripping position upon the bar stock 21 which has just been fed.

When the piston 78 reaches the end of its stroke, and occupies the position illustrated in the drawings, the port 81 is opened so that fluid under pressure now passes therethrough, and through the pipe 125, entering the cylinder or bore 83 through the port 91 between the lands 86 and 87 of the valve 84. These lands of the valve are now so positioned that the passageway 102 is uncovered and the passageway 95 is sealed from the port 91. The fluid under pressure therefore unseats the ball valve 104 and enters the cylinder 96 through the port 103. This causes the piston 100 to move to the right, as viewed in Figs. 2 and 6, it being remembered that the right-hand end of the cylinder 96 is now vented or exhausted through the passageway 95 which communicates between the lands 87 and 88 with the port 92 and the pipes 124 and 121. As the piston 100 moves to the right its piston rod 99 moves to the right until the nuts 120 abut the lug 111 provided upon the housing 82 of the fluid actuated mechanism 36, these nuts being adjusted so that the distance which the piston 100 moves is equal to the desired predetermined length of bar stock which is to be fed in the feeding operation. During this movement of the piston rod the bar stock feeding chuck 20 remains stationary since the jaws thereof are gripping the bar stock 21, the portion 110 of the rod slipping through the lower portion of the frame 38 of this chuck as permitted by the roller clutch carried thereby, see Fig. 4.

A portion of the fluid under pressure which is applied through the passageway 62 to the conduit 72, for effecting the collet chuck and bar feeding operations just described, is also applied through the passageways 136, 138, and pipe 139 to the passageway 140 in the body 59 of the valve, the rate of application of fluid through this path being regulated by the needle valve 137. This portion of the fluid enters the cylinder 144 through the port 143 causing the piston 145 to move to the left, as viewed in Figs. 2 and 7, the fluid in advance of the piston being exhausted through the port 146 and pipes 148 and 127 to the lubrication reservoir, not shown, in the headstock of the machine. When the piston 145 reaches the end of its stroke, the pressure of the fluid in the passageway 140 increases until it, plus the force of the spring 131, is sufficient to overcome the force of the spring pressed detent 135 so that the plunger 129 is moved to the right, rocking the projection 128 and the valve body 57 in a clockwise direction, thereby returning the valve body 57 to its neutral position. The needle valve 137 is so adjusted that a predetermined time elapses from the time that the valve 58 is operated, to effect chucking of the bar stock, and the time when the pressure in the passageway 140 is sufficient to return the valve 58 to its neutral position, the said predetermined time being sufficient to insure that adequate fluid pressure will have developed within the system to completely actuate the piston 78 to its extreme left-hand position with consequent closing of the chuck to work-gripping position.

The bar stock which has thus been fed and chucked may now be subjected to any desired machining operations and when these operations are completed, and the machined portion of the stock severed, the operations above described are repeated it being remembered that it is only necessary for the operator to sequentially move the handle 126 of the valve 58 in two different directions to effect release of the collet chuck from the bar stock, feeding of the bar stock, and gripping of the fed bar stock by the collet chuck.

Each time that the collet chuck is operated to work-gripping position the gripping pressure exerted thereby is indicated upon the indicator 150 which is connected, through the surge prevention device 152, with the conduit 72 through which fluid under pressure is applied for actuating the mechanism 36 in a manner to effect work-gripping by the chuck. The surge prevention device operates, as previously described, to prevent erroneous indications upon the gauge 150 due to the momentary high pressure developed in the system when the rollers 29 of the fingers 27 are upon the land portion of the cone, the piston 78 has reached the end of its stroke, and the feeding mechanism is actuated.

After the bar feeding chuck has advanced by repeated operations thereof to its extreme forward position, so that the bar feeding chuck housing is abutting the bracket member 107, the operator may grasp the handle or lever 116 and rock it so that the pin 117 releases the roller 114 of the clutch in the lower portion of the housing 38 for the bar stock chuck 20. He may then strip the bar stock chuck 20 rearwardly over the bar stock, to the right as viewed in Figs. 2, 3 and 4, the portion 119 of the piston rod 99 now passing freely through the housing 38. The lever 116 may then be returned to its initial position and the apparatus will operate as described above. However, the return of the bar feeding chuck to the initial position, in the manner just mentioned, is not necessary. It will be remembered that the piston 100 and its rod 99 move rearwardly of the machine, in preparation to feed a new length of the bar stock, while the chuck 22 is gripping the stock. Hence, if the housing 38 of the bar feeding chuck is in engagement with the bracket member 107 when the latter is moved by the piston 100 and rod 99, the bracket member 107 will carry the bar feeding chuck with it since the jaws 45 of the latter will slip or strip along the bar stock, the springs 48 in the bar chuck yielding slightly to permit this action. When the mechanism is operated in a bar feeding direction, however, the chuck 22 is in released position and hence the jaws 45 of the bar chuck grip the bar stock with sufficient force to feed the bar stock as before described. Hence, the bar stock may be fed by the mechanism of this invention until the rear end thereof is closely adjacent the rear end of the hollow spindle 23.

When substantially all of the bar stock has been fed, the handle 116 is then actuated, as described above to release the roller clutch and the bar feeding chuck is moved rearwardly of the machine carrying with it the bar stock supporting tube 19. A new piece of bar stock is then inserted in the tube 19, which may be moved out of alignment with the spindle for this purpose due to the pivotal mounting of the sleeve 17a and the usual relatively wide upper surface of the bracket 14. After the new piece of bar stock is in the tube 19 the latter is returned to alignment with the bar feeding chuck 20 and the spindle 23. The forward end of the new piece of bar stock is then inserted through the jaws 45 of the feeding chuck 20 and the handle 116 is returned to the position for again rendering the roller clutch operative. The mechanism is then actuated as before to feed the bar stock. If desired, the forward end of the new piece of bar stock may be caused to abut the rear end of the previously employed piece of bar stock so that the latter is fed, by each actuation of the feeding mechanism, until it has completely passed through the work-holding chuck 22.

Numerous modifications and adaptations of the apparatus herein illustrated and described will readily occur to those skilled in the art and, hence, the invention is not to be considered as limited to the exact details of construction and arrangement of parts herein illustrated and described, but only as required by the spirit and scope of the appended claims.

Having thus described my invention, I claim:

1. In a machine tool of the character described for operating upon bar stock and having a work-holding chuck adapted to grip a portion of the bar stock operated upon, the combination of the first cylinder having ports adjacent either end and single port intermediate the ends thereof, a piston in said cylinder, operative connections between said piston and the said work-holding chuck to actuate the latter by movement of the former, a second cylinder having ports adjacent either end thereof, a piston in said second cylinder, a bar feeding chuck, operative connections between said second piston and said bar feeding chuck to bodily move the latter in a direction effecting feeding of bar stock through the work-holding chuck when the second piston moves in one direction and to cause relative movement between said bar feeding chuck and said second piston when the latter moves in the opposite direction, a fluid actuated valve including a movable member having spaced lands adapted to selectively connect said single port of the first cylinder to either of the ports of the second cylinder and the other of said ports of said second cylinder to a drain, means for supplying a fluid under pressure, a multiple passageway valve for selectively connecting said source of fluid under pressure to either end port of said first cylinder and to ports adjacent either end of the movable member of said fluid actuated valve to act upon lands of the latter so that the application of fluid under pressure to said first cylinder for operation of the work-holding chuck also actuates said fluid operated valve to a position for application of fluid under pressure from the first cylinder through said intermediate port to said second cylinder after the said first piston has substantially completed its stroke, whereby the bar stock is fed only after the work-holding chuck has been completely released and the connections to the bar feeding chuck are conditioned for bar feeding operation only after the work-holding chuck has been completely actuated to work-gripping position.

2. The combination as defined in claim 1 and further comprising means to retain said multiple passageway valve in that operated position thereof which effects actuation of the work-holding chuck to gripping position, fluid pressure actuated means for automatically returning said multiple passageway valve to neutral position after operation thereof, and means to apply fluid under pressure to the last-mentioned means at a predetermined rate to assist the latter to overcome said retaining means a predetermined time after the multiple passageway valve is actuated to work-gripping position.

3. The combination as defined in claim 2 and in which means are provided to adjust the length of time said valve is held in its said operated position.

4. The combination as defined in claim 1 wherein the said second cylinder has a tapered opening in the side wall adjacent an end thereof providing one of the ports for said second cylinder, the said opening being progressively covered by the said second piston thereby braking the movement of the piston and of the bar stock.

5. The combination as defined in claim 1 and in which the said operative connections between said second piston and said bar feeding chuck comprise a one-way clutch which couples the said bar feeding chuck with said second piston for movement together when the said second piston is moved in a bar feeding direction and permits said bar feeding chuck to remain stationary when said second piston is moved in the opposite direction.

6. In a machine tool of the character described for operating upon bar stock and having a work-holding chuck adapted to grip a portion of the bar stock operated upon, the combination of a first cylinder having a port adjacent each end and a port intermediate its ends, a piston in said cylinder having a length sufficient to seal said intermediate port at all times except when said piston is at either extreme position in the cylinder, operative connections between said piston and the work-holding chuck to actuate the latter by movement of the former, a second cylinder, a piston in said second cylinder, a bar feeding chuck, operative connections between said second piston and said bar feeding chuck such that movement of said second piston in one direction moves said bar feeding chuck in a direction to cause feeding of the bar stock through the work-holding chuck and movement of said second piston in the other direction causes relative movement between the latter and said bar feeding chuck, the said second cylinder having ports adjacent the ends thereof, a hydraulically operated valve having a plurality of ports, a multiple passageway main valve, a source of liquid under pressure connected with said main valve, hydraulic connections from said main valve to the end ports of said first cylinder and to certain of the ports of said hydraulically actuated valve, hydraulic connections between the intermediate port of said first cylinder and one of the ports of said hydraulically actuated valve and hydraulic connections between the remaining ports of said hydraulically actuated valve and the ports of said second cylinder such that the said hydraulically actuated valve selectively establishes communication between said intermediate port of said first cylinder and one or the other of the ports on opposite sides of the piston in said second cylinder, whereby operation of the said main valve to one position supplies liquid under pressure to the hydraulically actuated valve and to the first cylinder actuating the former and causing the piston in the latter to actuate the work-holding chuck to work releasing position and to uncover said intermediate port so that the liquid under pressure passes therethrough and through said hydraulically actuated valve to enter said second cylinder through one of the ports therein causing the piston in the said second cylinder to move said bar feeding chuck in the bar feeding direction, and operation of the main valve in the opposite direction supplies liquid under pressure to said hydraulically actuated valve and to said first cylinder to actuate the hydraulically actuated valve and first piston in the opposite direction thereby actuating the work-holding chuck to work gripping position and thereafter supplying liquid under pressure to said second cylinder to return the piston therein to its initial position so that the apparatus is prepared to feed a new length of bar stock upon the next actuation of said main valve in the proper direction.

7. The combination as defined in claim 6 and further comprising means applying a resilient restoring force to said main valve when it is displaced from its neutral position to effect automatic return thereto.

8. The combination as defined in claim 6 and further comprising means applying a resilient restoring force to said main valve when it is displaced from its neutral position, means to hold said main valve in the operated position thereof wherein it supplies fluid for work-gripping by the work-holding chuck, and fluid actuated means operating upon said main valve to restore it to its neutral position a predetermined interval of time after it has been actuated to said operated position.

9. The combination as defined in claim 6 and further comprising means to indicate those hydraulic pressures applied to the said first cylinder which are proportional to the pressure exerted by the work-holding chuck upon the bar stock, and means to prevent surges of hydraulic pressures which are disproportional to the work-holding pressures from being communicated to said indicating means.

10. The combination as defined in claim 6 and in which the said operative connections between the first piston and the work-holding chuck include a floating lever pivotally connected to said first piston and to a movable part of said work-holding chuck, and a pair of links pivoted on a stationary part of the machine tool and to the said floating lever in spaced relationship along the latter in a manner such that substantially the entire force exerted by the said first piston is effective to operate said work-holding chuck.

11. In a machine tool of the character described for operating upon bar stock and having a work-holding chuck adapted to grip a portion of the bar stock operated upon, the combination of a bar feeding chuck, a fluid actuated piston operatively connected to said work-holding chuck to operate the latter, a second fluid actuated piston operatively connected to said bar feeding chuck to bodily move the latter, fluid actuated valve means between said first and second pistons operative to selectively control the supplying of fluid under pressure to either side of said second piston, valve means for selectively applying fluid under pressure to either side of the first-mentioned piston and to said fluid actuated valve means for effecting operation of the latter and of said work-holding chuck, and fluid passageways uncovered by movement of the first-mentioned piston at either extreme of its extent of movement for conducting a portion of the fluid supplied thereto through the said fluid actuated valve means to the said second piston at that side thereof as determined by the actuated position of the fluid actuated valve means, whereby the bar stock feeding chuck is moved only after the work-holding chuck has been fully operated.

12. The combination as defined in claim 11 wherein the operative connections between the second piston and said bar feeding chuck include means providing a positive connection of the second piston to the feeding chuck when the said second piston moves in a direction to produce feeding of the bar stock and permits relative movement between the bar feeding chuck and the second piston when the latter moves in the opposite direction, and means for determining the length of bar stock fed comprising a stationary lug, a lug connected to a portion of said operative connections between said bar feeding chuck and said second piston, an elongated threaded member carried by one of said lugs and movable through an opening in the other, and nut-like abutment means adjustable on the portion on said elongated threaded member extending beyond the said other lug and adapted to engage the latter for limiting the amount of separation between said lugs thereby limiting the movement of said piston in the non-bar feeding direction.

FAY M. TOMLINSON.

References Cited in the file of this patent

UNITED STATES PATENTS

| Number | Name | Date |
|---|---|---|
| 1,604,116 | Drissner | Oct. 26, 1926 |
| 1,844,107 | Sheperdson | Feb. 9, 1932 |
| 2,019,155 | Ruppel | Oct. 29, 1935 |
| 2,047,832 | Morton | July 14, 1936 |
| 2,067,064 | Platz | Jan. 5, 1937 |
| 2,078,698 | Svenson | Apr. 27, 1937 |
| 2,116,376 | Anderson | May 3, 1938 |
| 2,308,348 | Ballash | Jan. 12, 1943 |
| 2,339,712 | Mariotte | Jan. 18, 1944 |
| 2,366,908 | Jenkins | Jan. 9, 1945 |
| 2,369,466 | Kylin et al. | Feb. 13, 1945 |
| 2,372,408 | Trich | Mar. 27, 1945 |
| 2,451,210 | Gamble | Oct. 12, 1948 |